Patented Feb. 8, 1944

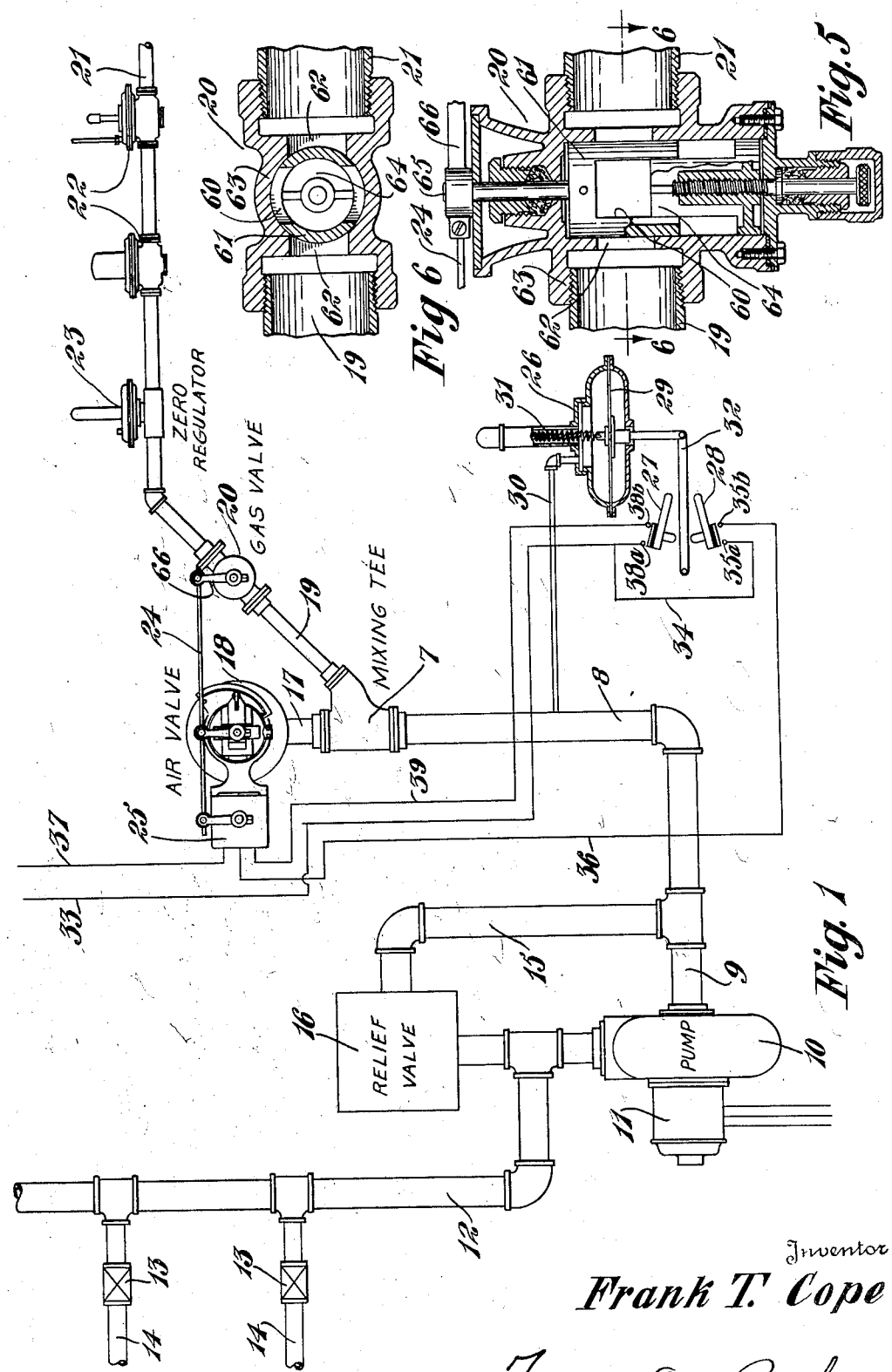

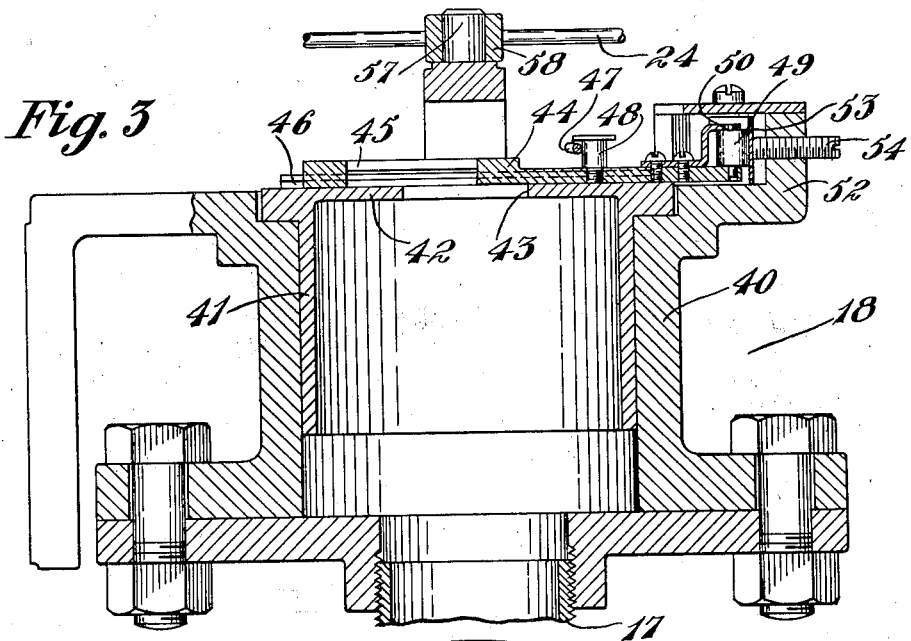
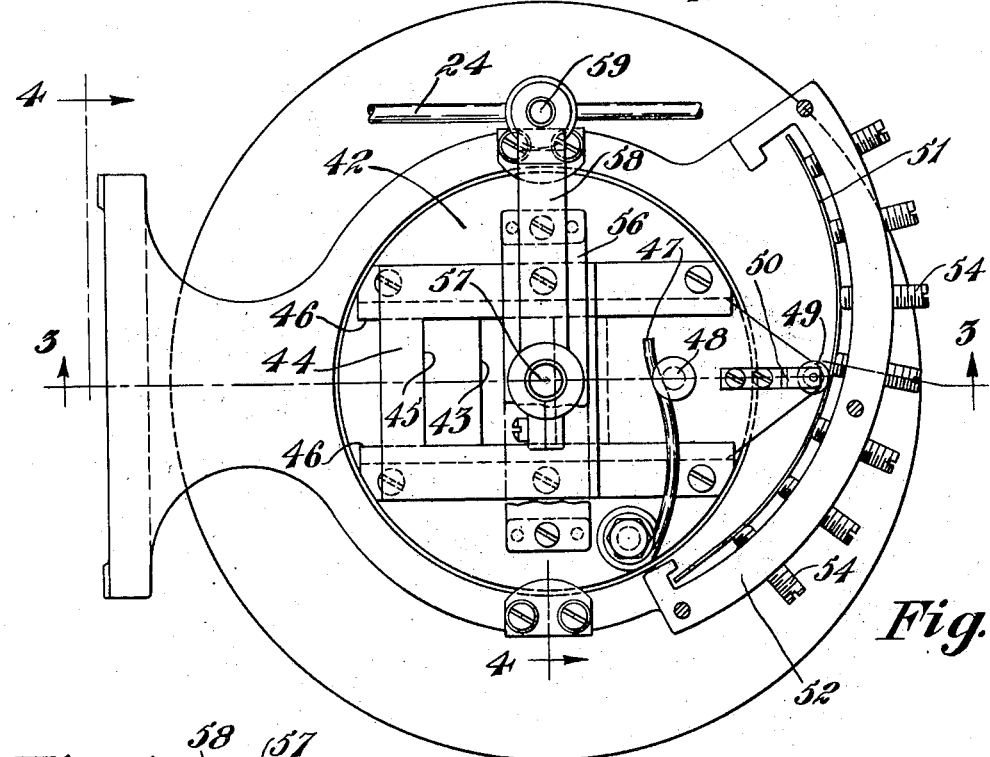
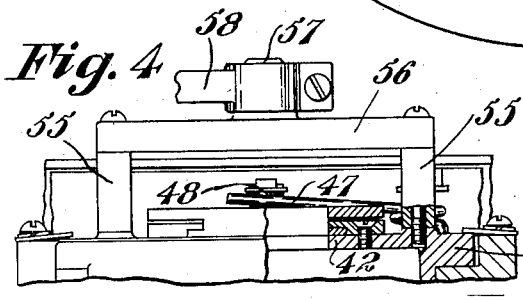

2,341,177

UNITED STATES PATENT OFFICE 2,341,177

FUEL MIXING APPARATUS

Frank T. Cope, Salem, Ohio, assignor to The Electric Furnace Company, Salem, Ohio, a corporation of Ohio Application September 16, 1940, Serial No. 357,072

7 Claims. (Cl. 137—165)

The invention relates to mixing air and gas together to form a fuel or gaseous mixture; and relates more particularly to mixing apparatus adapted for maintaining a constant ratio, or an exact or controlled relationship of two gases such as air to gas, by volume, where the demand on the apparatus, or the total flow through the apparatus, may vary over extremely wide ranges.

There are in use, particularly in connection with the treatment of non-ferrous metals, gas fired heat treating furnaces in which the burners that supply and burn the fuel for heating the material also supply from the burned gases an atmosphere for protecting the work from oxidation. Such furnaces are commonly called "special atmosphere furnaces"; and in the operation of such furnaces the burner fuel demand ordinarily varies over very wide ranges and, if the special atmosphere maintained in the furnace is to be effective, the relationship of the constituents thereof must be carefully controlled.

It is therefore essential that a constant ratio of air to gas be maintained in the fuel mixture supplied to the burners, irrespective of the rate of flow of the air-gas mixture to and through the burners, or in other words, irrespective of the burner fuel demand, so that the constituents of the burned gases have a predetermined controlled relationship.

There is also another type of gas fired furnace used in which it is desired to maintain a constant or controlled air-gas ratio over large burner turn down ranges. Thus, in the operation of batch type furnaces, the burners have a heavy fuel demand in bringing relatively cold material up to heat, and then have a relatively light fuel demand while the material soaks at a desired temperature without much if any temperature change.

In such furnace operation, it is of course necessary to maintain a burnable mixture at the burners at all times, which may preferably be a constant ratio air-gas mixture. In some instances it may be desirable to have a slightly richer mixture when the burner fuel demand is very low, as when the material is soaking at a maintained temperature, for preventing the burners from going out or flashing back.

Prior air-gas premixing systems, intended for central location and for supplying a plurality of furnace zones, have been of two general types. In the first, a pump or blower is provided which draws air from the atmosphere through a first orifice and gas from a source maintained as nearly as possible at atmospheric pressure, through a second orifice. Both orifices are of fixed size. Such apparatus maintains constant ratio within limits because the differentials across the two orifices are identical regardless of varying rates of flow. However, a serious difficulty arises from the fact that these pressure differentials vary as the square of the flow. In practice, it is found that satisfactory accuracy, which requires control of the ratio within say 5%, cannot be expected at flow variations exceeding 5 or 6 to 1. The reason is that at very high differentials, there are errors due to compressibility of the gases, while at very low differentials, the unavoidable imperfections of gas pressure control devices also become serious.

In the second type, a pump or blower is also provided, which draws the fluids through valves. These valves are provided with ports, usually rectangular, whose sizes may be changed by movement of a slide member. The slide members are so connected that their port areas at all positions of the slide members remain in a fixed relation. Pressure responsive means are provided to maintain an approximately constant pressure drop across the valves, by moving the slides as required. Although this arrangement overcomes the difficulties just mentioned, it introduces a new error because of the varying shape of the ports. The discharge coefficients of the ports may change materially with change in shape, and the accuracy of ratio control suffers accordingly.

It is obvious that apparatus of the first mentioned type will not serve where turndown ranges of 20 to 1, or more, are required. Even the second type (which has been used for such ranges, and is much better than the first) fails to provide the desired accuracy. Therefore a distinct need exists for a form of apparatus employing variable orifices and having means for compensating for the change in discharge coefficient of such orifices.

In order to approach a solution of these difficulties it is desirable that the pressure drop at air and gas orifices leading to a mixing chamber be maintained at a constant value at all times regardless of flow. In order to permit variations in rate of flow it is then necessary to have air and gas orifices that are adjustable as to size. It is also necessary to maintain a proper or selected relationship between the air and gas orifice sizes as the sizes thereof are adjusted.

The use of variable sized orifices creates other difficulties, because any device for changing the size or area of an orifice or passage is essentially a valve, and it is difficult if not impossible to be certain of or to ascertain the discharge characteristics per unit of opening or area of an orifice or opening for each adjusted position thereof. That is to say, there are or may be material changes in the flow coefficient of an orifice for different rates of flow of gases therethrough when the size and shape of the orifice is changed.

Theoretically, this difficulty would not be of much consequence if it were possible to utilize a circular orifice and change the size thereof while always maintaining a true circular opening. However, it is apparently impossible to construct any device presenting a true circular opening, which may be enlarged or reduced in size while still maintaining an absolutely true circular outline; and the difficulty incident to changes in the flow coefficient of a non-circular orifice, such as a square or rectangular orifice, with a changing size and a change in rate of flow, constitutes a real problem.

Moreover, for economic reasons with respect to the size and cost of the blower which draws the air-gas mixture from the fuel mixing apparatus and discharges it to the control valves and fuel burner, it is desirable to keep the pressure drop at the air and gas orifices of the fuel mixing apparatus as low as possible, which further magnifies or complicates the difficulties previously outlined.

Accordingly, it is an object of the present invention to provide a fuel mixing apparatus having air and gas orifices in which the pressure drop at the orifices may be controlled, or maintained at a constant value at all times, irrespective of changes of size in said orifices or changes in the rate of flow therethrough.

Moreover, it is an object of the present invention to provide fuel mixing apparatus for mixing air and gas in which an air-gas ratio may be maintained within 5 per cent of a selected value for burner turn down or flow ratios of 20 or more to 1.

It is a further object of the present invention to provide a fuel mixing apparatus having variable sized orifices, in which adjustments may be made to compensate for variations in the flow coefficient of any orifice incident to a change in size thereof, or a change in rate of flow therethrough.

It is also an object of the present invention to provide fuel mixing apparatus having a pluraltiy of orifices adjustable as to size with means for adjusting the relative amounts of opening of the said adjustable orifices.

It is also an object of the present invention to provide fuel mixing apparatus having one or more orifices that are adjustable as to size, which size may be enlarged or reduced at a predetermined rate, with means for changing the rate of change of opening.

It is also an object of the present invention to provide a fuel mixing apparatus wherein a constant or controlled pressure drop is maintained through variable orifices with changing rates of flow, with means for compensating for variations in the supply pressure of gases mixed thereby.

Prior mixing devices capable of supplying a substantially constant ratio air-gas mixture for low burner turn down ranges usually deviate at low rates of flow. It is, however, desirable in some instances to maintain a substantially constant air-gas ratio throughout a large burner turn down range, with the exception that it is sometimes desired to have a somewhat richer mixture at extremely low rates of flow.

It is therefore a further object of the present invention to provide a fuel mixing apparatus in which a controlled relationship of two gases such as air and gas may be maintained over large burner turn down ranges so as to supply a substantially constant ratio mixture throughout most of the range and a somewhat richer mixture at the lowest rates of flow.

These and other objects may be obtained and the above difficulties overcome by the devices, constructions, arrangements, combinations, parts, elements and apparatus which comprise the present invention, the nature of which is set forth in the following general statements, a preferred embodiment of which is set forth in the following description and is shown in the drawings, and which are particularly and distinctly pointed out and set forth in the appended claims forming part hereof.

The nature of the improved apparatus of the present invention may be stated in general terms as including in fuel mixing apparatus for mixing gaseous fluids in controlled proportions, a valve for one fluid, a second valve for another fluid, means for varying the size of the orifice of one valve, means for simultaneously actuating said valves to enlarge or reduce the opening thereof, means for adjusting the relative rates of opening or closing of said valves, a mixing chamber into which gases from said valves are discharged, and means controlled by the pressure in said mixing chamber for operating said valve actuating means to maintain a substantially constant pressure drop across said valves, irrespective of the rate of flow therethrough.

By way of example, a preferred embodiment of the improved apparatus is illustrated in the accompanying drawings forming part hereof, in which Figure 1 is a diagrammatic view of the improved apparatus;

Fig. 2 is a plan view of one of the valves of the improved apparatus;

Fig. 3 is a section looking in the direction of the arrows 3—3, Fig. 2;

Fig. 4 is a fragmentary view looking in the direction of the arrows 4—4, Fig. 2;

Fig. 5 is a vertical section of the other valve; and

Fig. 6 is a section taken on the line 6—6, Fig. 5.

Similar numerals refer to similar parts throughout the various figures of the drawings.

The improved fuel mixing apparatus and its arrangement in a control system adapted for supplying a constant or controlled ratio air-gas mixture to one or more burners of a gas fired furnace, is illustrated somewhat diagrammatically in Figure 1. The improved apparatus essentially utilizes the orifice meter principle of mixing, in which air and gas are drawn through orifices at a pressure below atmospheric pressure. The apparatus includes a mixing T or chamber 7, which communicates through piping 8 and 9 with the intake side of a blower or pump 10 driven by an electric motor 11. The pump 10 discharges the air-gas mixture through piping 12 to burner control valves 13. Control valves 13 discharge through piping 14 to the individual burners of a furnace (not shown). A by-passing piping 15 having a relief valve 16 therein, may extend between pipes 8 and 12 in parallel with pump 10 in a usual manner.

Air may be supplied to the mixing T or chamber 7 through pipe 17 leading from air valve generally indicated at 18, and gas may be supplied to mixing T or chamber 7 through pipe 19 leading from gas valve generally indicated at 20. Gas is preferably supplied to gas valve 20 by piping 21 leading from any suitable source of supply; and piping 21 may include protective valves 22 and a zero regulator 23 of usual construction.

The air and gas valves 18 and 20 are hereinafter described more in detail. Referring to Fig. 1, they are both simultaneously operated by rod 24 extending from valve actuating motor 25. The operation of motor 25 is controlled by diaphragm control 26 and switches 27 and 28. Diaphragm 29 in diaphragm control 26 is spring loaded, and one side preferably the spring side of the diaphragm chamber, communicates through pipe 30 with piping 8 just below mixing T or chamber 7.

Generally, the operation of the fuel mixing and burner control system is as follows:

Proper operation of the system requires that a constant suction be maintained in mixing chamber 7 and line 8 at all times, and I have found that a suction of 10 inches of water in line 8 produces very consistent results. However, this suction may have any reasonable value above, say one inch of water.

With the amount of suction to be maintained in line 8 determined, spring 31 of diaphragm control 26 is loaded so that diaphragm 29 is in central or neutral position when suction in line 8 is at the set or selected value. When the suction in line 8 drops below the set value, as when the fuel demand at the furnace burners decreases, spring 31 moves diaphragm 29 and lever 32 connected therewith to close normally open microswitch 28.

An electric circuit is thus established through line 33, line 34, contacts 35a and 35b of switch 28, line 36, valve control motor 25 and line 37. Valve actuating motor 25 operates to move rod 24 in one direction, which begins to close valves 18 and 20. The closing of said valves continues until the suction is again built up in line 8 to the set value, when the suction overcomes spring load 31 and operates lever 32 to open switch 28, thus stopping motor 25 and stopping further closing of valves 18 and 20.

Conversely, when the fuel demand at the furnace burners increases, the suction tends to build up in line 8, which moves diaphragm 29 in the other direction, so that lever 32 closes microswitch 27. When this occurs, an electric circuit is established through line 33, contacts 38a and 38b of switch 27, line 39, valve control motor 25 and line 37 starting valve motor 25 to move rod 24 in the other direction to open up valves 18 and 20 until the suction in line 8 is reduced to the set value, when spring 31 returns diaphragm 29 to neutral position, opening switch 27 and stopping valve motor 25, which in turn stops further opening of valves 18 and 20.

The system therefore maintains the suction in line 8 and mixing T or chamber 7 constant at all times, irrespective of fuel demand at the furnace burners, or in other words, irrespective of the flow through line 8.

Assuming that the air and gas pressures on the intake side of valves 18 and 20 could both be maintained absolutely equal and constant, the pressure drops across the orifices in said valves would be constant irrespective of changes in sizes of said orifices or changes in rate of flow therethrough, and theoretically a constant ratio of air and gas introduced into and mixed in the mixing T or chamber 7 would result. However, due to changes in the flow coefficients of varying sized orifices, and to variations in the pressure of gas in line 21 or the sluggishness of operation of zero regulator 23, and for other reasons, this theoretical relationship cannot be actually obtained without providing for certain adjustments in either one or both of valves 18 and 20.

Referring more particularly to Figs. 2, 3 and 4, wherein the construction of the air valve 18 is shown more in detail, the valve may include the housing 40, to which outlet pipe 17 is connected. A flanged cup-shaped member 41 is rotatably mounted in housing 40, provided with a wall 42 having a rectangular intake orifice 43 therein.

A slide member 44 also having a rectangular orifice 45 therein is mounted for sliding movement in ways 46 on wall 42 so that (viewing Fig. 3) movement of member 44 to the right enlarges the effective size of air intake orifice 43, and movement of member 44 to the left reduces the effective size of air intake orifice 43.

Spring 47 reacting against pin 48 on slide 44 normally tends to move slide 44 to the right (Fig. 2); and this movement is resisted by contact of roller 49 mounted at 50 on slide 44, with adjustable cam surface 51 carried by bracket 52 on valve housing 40.

Adjustable cam surface 51 is preferably formed by a curved spring steel strip 53 backed up by adjusting screws 54.

Member 41 is preferably provided with a pair of upright posts 55 supporting a crosspiece 56 and trunnion 57, to which lever 58 is connected; and the outer end of lever 58 is pivotally connected at 59 to valve motor operating rod 24 so that movement of rod 24 to the right (Fig. 2) rotates member 41 in a clockwise direction and movement of rod 24 to the left rotates member 41 in a counterclockwise direction.

When member 41 is rotated in a clockwise direction, cam surface 51 engages roller 49 to move slide member 44 to reduce the effective size of air intake orifice 43; and when member 41 is rotated in a counterclockwise direction, the reverse action takes place to increase the effective size of air intake orifice 43. By providing a large number of cam surface set screws 54, each of which may be individually adjusted, the rate of change of the effective size of orifice 43 as it is opened or closed may be adjusted (in accordance with the results of tests on the system) in order to compensate for changes in the flow coefficient of the orifice for various sizes thereof or for changes in the flow of air therethrough, or for other unbalances in the system.

Referring to Figs. 5 and 6, gas valve 20 may be a usual form of adjustable port valve in which a rectangular port 60 is provided in movable valve member 61, which opens or closes across rectangular ports 62 in the stationary valve member or casing 63. The rectangular port or orifice 60 may be adjustable as to size by movement of member 64 in usual manner, and movable member 61 may be rotated through trunnion 65, to which lever 66 is attached, which is also operated by a valve rod 24. Thus, movement of rod 24 in one direction tends to close valve 20 or reduces the size of orifice 60—62 therethrough and movement of rod 24 in the other direction tends to open valve 20 or increase the size of orifice 60—62.

In the drawings, valve 18 is indicated as an air valve, and valve 20 is indicated as a gas valve, but by minor changes in sizes and arrangements of said valves, valve 20 could be the air valve, and valve 18 could be the gas valve. Moreover, these valves have been described as being air and gas valves, but the system may be used for mixing other gases than air and fuel gas.

In any event, it is desirable to have the adjustment, for changing the rate of change in orifice size upon closing or opening the orifice, included in the valve having the largest amount of flow therethrough, because adjustment for the system is therefore more sensitive. Moreover, the adjustment of said adjusting means, that is adjusting screws 54 in valve 18, may be made not only for compensating for variations in the flow coefficient of valve 18, but also of valve 20, because valves 18 and 20 move simultaneously or in unison, and this compensating adjustment when required, is a relative one.

Accordingly, when the equipment illustrated diagrammatically in Fig. 1 is installed for any furnace, and the air-gas ratio to be maintained at a constant value over large burner turn down ranges is established, the valve settings of valves 18 and 20 are temporarily made, and the equipment tested to determine fluctuations in the air-gas ratio. From the results of such tests, set screws 54 are adjusted to compensate for the unpredictable changes in orifice flow coefficients, for the sluggishness of operation of the zero regulator 23, particularly at low flows, and for any other unbalances in the system incident to the particular installation.

If at any time a different air-gas ratio is desired to be maintained, it may be obtained by adjusting the size of the adjustable port in valve 20 and then balancing the system by adjustment of valve 18.

If a richer mixture is desired for low rates of flow, it may be obtained by the initial adjustments of adjusting means 51—54 of valve 18.

I have discovered that the construction and arrangement illustrated and described herein can be used to satisfactorily maintain and supply a constant desired air-gas ratio within five per cent of a selected value over a 20 or more to 1 burner turn down range.

The embodiment of the present improvements illustrated and described herein is by way of example, and the scope of the present invention is not limited to the same or to the particular details thereof.

Having now described the features of the invention, the construction, operation and use of a preferred embodiment thereof, and the advantageous, extraordinary and heretofore unattainable results attained by the improved constructions; and new and useful parts, elements, combinations, constructions and devices, and reasonable mechanical equivalents thereof obvious to those skilled in the art, are set forth in the appended claims.

I claim:

1. In apparatus for mixing gaseous fluids in controlled proportions, a plurality of valves discharging into a common conduit, each valve having an orifice, means for actuating said valves to simultaneously enlarge or reduce the orifice openings thereof, means for varying the relative rates of opening or closing of said valves throughout their ranges of actuation, means for maintaining the same substantially constant pressure in the sources of supply to said valves, and means for operating said valve actuating means to maintain a substantially constant pressure in the common conduit, whereby a substantially constant pressure drop across said orifices is maintained irrespective of the rates of flow therethrough.

2. In apparatus for mixing gaseous fluids in controlled proportions, a plurality of valves discharging into a common conduit, each valve having an orifice, means for actuating said valves to simultaneously enlarge or reduce the orifice openings thereof, adjustable cam means for varying the relative rates of opening or closing of said valves throughout their ranges of actuation, means for maintaining the same substantially constant pressure in the sources of supply to said valves, and means for operating said valve actuating means to maintain a substantially constant pressure in the common conduit, whereby a substantially constant pressure drop across said orifices is maintained irrespective of the rates of flow therethrough.

3. In apparatus for mixing gaseous fluids in controlled proportions, a plurality of valves discharging into a common conduit, each valve having an orifice, means for actuating said valves to simultaneously enlarge or reduce the orifice openings thereof, means for varying the rate at which one of said valves opens or closes at places in its range of actuation with respect to the rate at which the other valve opens or closes, means for maintaining the same substantially constant pressure in the sources of supply to said valves, and means for operating said valve actuating means to maintain a substantially constant pressure in the common conduit, whereby a substantially constant pressure drop across said orifices is maintained irrespective of the rates of flow therethrough.

4. In apparatus for mixing gaseous fluids in controlled proportions, a plurality of valves discharging into a common conduit, each valve having a variable orifice, means for selectively adjusting the orifice size of one of said valves independently of operation of its actuator, means for actuating said valves to simultaneously enlarge or reduce the orifice openings thereof, means for varying the relative rates of opening or closing of said valves throughout their ranges of actuation, means for maintaining the same substantially constant pressure in the sources of supply to said valves, and means for operating said valve actuating means to maintain a substantially constant pressure in the common conduit, whereby a substantially constant pressure drop across said orifices is maintained irrespective of the rates of flow therethrough.

5. In apparatus for mixing gaseous fluids in controlled proportions, a plurality of valves discharging into a common conduit, each valve having a variable orifice, means for selectively adjusting the orifice size of one of said valves independently of operation of its actuator, means for varying the rate at which the other of said valves opens or closes at places in its range of actuation with respect to the rate at which said one valve opens or closes, means for actuating said valves to simultaneously enlarge or reduce the orifice openings thereof, means for maintaining the same substantially constant pressure in the sources of supply to said valves, and means for operating said valve actuating means to maintain a substantially constant pressure in the common conduit, whereby a substantially constant pressure drop across said orifices is maintained irrespective of the rates of flow therethrough.

6. In apparatus for mixing gaseous fluids in controlled proportions, a plurality of valve means each operable over a range of opening and each including a variable size orifice discharging into a common conduit, means for simultaneously opening and closing said orifices, means independent of said opening and closing means for adjusting the relative sizes of said orifices at points throughout said range of opening, means for maintaining the same substantially constant pressure in the sources of supply to said valve means, and means for maintaining a substantially constant pressure in the common conduit, whereby a condition of constant pressure drop across said orifices is maintained.

7. In apparatus for mixing gaseous fluids in controlled proportions, a plurality of valve means each operable over a range of opening and each including a variable size orifice discharging into a common conduit, means for simultaneously opening and closing said orifices, means independent of said opening and closing means for adjusting the relative sizes of said orifices at points throughout said range of opening, means for maintaining the same substantially constant pressure in the sources of supply to said valve means, and means responsive to the pressure in said conduit for maintaining a substantially constant pressure in the common conduit, whereby a condition of constant pressure drop across said orifices is maintained.

FRANK T. COPE.